(12) United States Patent
Boussant-Roux et al.

(10) Patent No.: US 7,335,617 B2
(45) Date of Patent: Feb. 26, 2008

(54) REFRACTORY PRODUCT FOR A CHECKER WORK ELEMENT OF A GLASS FURNACE REGENERATOR

(75) Inventors: Yves Boussant-Roux, Montfavet (FR); Michel Gaubil, Avignon (FR); Olivier Citti, Cavaillon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 0 days.

(21) Appl. No.: 10/553,410

(22) PCT Filed: Apr. 15, 2004

(86) PCT No.: PCT/FR2004/000928

§ 371 (c)(1), (2), (4) Date: Mar. 14, 2006

(87) PCT Pub. No.: WO2004/094332

PCT Pub. Date: Nov. 4, 2004

(65) Prior Publication Data

US 2006/0172879 A1   Aug. 3, 2006

(30) Foreign Application Priority Data

Apr. 17, 2003  (FR)  ................................. 03 04819

(51) Int. Cl.
*C04B 35/107* (2006.01)
*C04B 35/119* (2006.01)

(52) U.S. Cl. ............... 501/127; 501/105; 501/119; 501/128

(58) Field of Classification Search .......... 501/105, 501/127, 128, 119
See application file for complete search history.

(56) References Cited

U.S. PATENT DOCUMENTS

| 2,019,208 A | 10/1935 | Baumann, Jr. et al. |
| 3,247,001 A | 4/1966 | Alper et al. |
| 3,777,805 A | 12/1973 | Racasens et al. |
| 3,844,803 A | 10/1974 | Blanke et al. |
| 5,005,635 A | 4/1991 | Zanoli et al. |

FOREIGN PATENT DOCUMENTS

| FR | 1 208 577 | | 2/1960 |
| GB | 1 318 442 | | 5/1973 |
| JP | 10-218676 | | 8/1998 |
| RU | 2 039 025 | | 7/1995 |
| SU | 1470730 | * | 8/1977 |
| SU | 567709 | * | 4/1989 |

OTHER PUBLICATIONS

Brown et al., "Fused Cast Refractories", XP-002056979, The Glass Industry, Glass Industry Magazine, New York, vol. 45, Oct. 1, 1964, pp. 536-538, 543-547.
Popov, "Rational Use of Refractories and Optimum Designs of Regenerator Checkerwork in Glass-Melting Furnaces", Glass and Ceramics, Consultants Bureau, New York, vol. 59, No. 9-10, Sep. 2002, XP-001144064, pp. 335-338.

* cited by examiner

*Primary Examiner*—Karl E Group
(74) *Attorney, Agent, or Firm*—Young & Thompson

(57) ABSTRACT

The invention relates to a melted and cast refractory product which is intended, for example, for a checker work element of a glass furnace regenerator, having the following average chemical weight composition, expressed in weight percent based on oxide content: $0.4\% < MgO < 2.5\%$; $0.2\% < SiO_2 < 2\%$; $CaO < 0.4\%$; impurities $< 0.5\%$ $Al_2O_3$: complement.

11 Claims, No Drawings

REFRACTORY PRODUCT FOR A CHECKER WORK ELEMENT OF A GLASS FURNACE REGENERATOR

The invention relates to a high-alumina fused-cast refractory product and to the use of this product as an element for the construction of checker works in glass furnace regenerators.

Fused-cast products, often called electrocast products, are obtained by melting a mixture of suitable raw materials in an electric arc furnace or by any other technique suitable for such products. The molten liquid is then cast into a mold, and the product obtained then undergoes a controlled cooling cycle.

Most fired glass furnaces, that is to say those having gas or fuel-oil burners as energy source, are fitted with regenerators. These regenerators comprise a succession of chambers lined with ceramic elements forming a checker work and allowing heat to be recovered and regenerated according to the cycles. The hot gases or flue gases that emanate from the furnace in operation enter the checker work generally via the top of the regenerator and release their thermal energy into the checker work. During this time, cold air is drawn in at the bottom of another checker work heated during the previous cycle in order to recover the thermal energy; this air leaves the top of the checker work as hot air, from where it is conducted to the furnace burners in order to ensure that the fuel is burnt under optimum conditions. The elements that make up the checker work undergo this alternating operation and must have very good thermal shock resistance.

The shapes of the ceramic elements that make up the checker work can vary, these being described for example in patents FR 2 142 624, FR 2 248 748 and FR 2 635 372.

The composition of the fused-cast products used to produce the checker works is generally of the AZS (alumina-zirconia-silica) type or of the aluminous type.

Products having high alumina contents or "aluminous" products are known to have better high-temperature resistance and are therefore mainly used in the top parts of checker works. At the present time, significant changes are being observed in the way glass furnaces are being operated. For example, mention may be made of the increasing use of gaseous fuel as a substitute for liquid fuel of the fuel-oil type, in particular in melting furnaces for making glass for television screens. Moreover, the trend in melting furnaces for soda-lime glass is toward more reducing operating conditions. These changes in furnace operation make the flue gases more aggressive with respect to the refractory products within the regenerators. In particular, corrosion of the bottom parts of checker works is observed as a result of the deposition by condensation of alkaline species (especially NaOH, KOH, . . . ) Faced with this type of attack, current aluminous or AZS refractory products do not provide sufficient resistance (see the results of specimen 1).

Moreover, patent U.S. Pat. No. 2,019,208, filed on Dec. 16, 1933, discloses alumina-magnesia refractory products containing between 2 and 10% magnesium and exhibiting good resistance to thermal variations. However, these products pose industrial feasibility problems. Furthermore, the company SEPR manufactures and sells the product ER5312RX which contains about 87.5% $Al_2O_3$, 4.5% $Na_2O$ and 8% MgO. Crystallographic analysis of ER5312RX reveals predominantly beta-alumina third. Although this product exhibits excellent resistance to corrosion by alkali metal vapor, its behavior with respect to condensates of alkaline species is mediocre.

There therefore exists a need for a new fused-cast refractory product having greater resistance to corrosion by liquid species predominantly consisting of alkali metal elements and exhibiting good thermal-shock resistance.

The present invention aims to satisfy this need.

More particularly, it relates to a fused-cast refractory product having the following average chemical composition by weight, the percentages by weight being on the basis of the oxides:

0.4%<MgO<2.5%;
0.2%<$SiO_2$<2.0%;
CaO<0.4%;
impurities: <0.5%;
$Al_2O_3$: balance.

The term "balance" is understood to mean the quantity needed to bring the total to 100%. Conventionally, the impurities consist of $Na_2O$ and $Fe_2O_3$.

As will be seen in greater detail in the rest of the description, the refractory products according to the invention possess good alkaline corrosion resistance and good thermal-shock resistance.

The term "alkaline corrosion" is understood to mean the corrosion that results from the condensation of alkali metal gases. To give an example, mention may be made of the case of the flue gases resulting from the melting of soda-potash glass which, when the sulfur content in the flue gases is low and/or the conditions are reducing conditions, give rise to the condensation of species such as NaOH, KOH in the bottom of the checker works. This is because the absence of sulfur, or else reducing conditions prevent the formation of species such as $Na_2SO_4$ or $K_2SO_4$. Liquid-phase corrosion of the refractories is then observed.

Unless mentioned to the contrary, the percentages used in the present application always refer to percentages by weight on the basis of the oxides.

According to other preferred features of the refractory product according to the invention:

the MgO content is such that 0.7%<MgO and/or MgO<2.0%;
the $SiO_2$ content is such that 0.5%<$SiO_2$ and/or $SiO_2$<1%;
the CaO content is such that CaO<0.1%;
the refractory product according to the invention furthermore includes, in percentages by weight on the basis of the oxides:
an $Na_2O$ content such that 0.1%<$Na_2O$ and/or $Na_2O$<0.6% and/or
a $ZrO_2$ content such that $ZrO_2$<4.0%, preferably such that $ZrO_2$<0.1%.

Preferably, fluorine is added in an amount of between 0.1 and 0.6% to the mixture of raw materials. The product therefore preferably has, as a percentage by weight on the basis of the oxides, an F content such that 0.1%<F and/or F<0.6%.

The invention also relates to the use of a refractory product according to the invention as a checker work element of a glass furnace regenerator, preferably as an element of the bottom part of a checker work of a regenerator. Advantageously, the product according to the invention can be used in melting furnaces for soda-lime glass that operate under reducing conditions.

Table 1 below summarizes the results of tests carried out on various specimens. The nonlimiting products tested are given for the purpose of illustrating the invention.

The following raw materials were used:
alumina of the AC44 type, sold by Pechiney, containing on average 99.5% $Al_2O_3$ ($Na_2O$: 3700 ppm, $SiO_2$: 100 ppm, CaO: 160 ppm, $Fe_2O_3$: 120 ppm);

alumina of the AR75 type, sold by Pechiney, containing on average 99.4% $Al_2O_3$ ($Na_2O$ 2700 ppm, $SiO_2$ 100 ppm, CaO 160 ppm, $Fe_2O_3$ 110 ppm);

NEDMAG 99 or NEDMAG 99.5 magnesia, containing more than 99% and 99.5% MgO respectively, sold by Nedmag Industries; and fluorine in $AlF_3$ form.

The mixtures of raw materials were melted using a conventional melting process in an arc furnace, as described for example in FR 1 208 577 or in FR 2 058 527, and then they were cast into a mold (for example according to the method described in FR 2 088 185) in order to obtain parts of the X3 type, which could be used as regenerator elements. These parts have a four-branch cruciform shape, each branch having a height of 420 mm, a length of 130 mm and a thickness of 30 mm.

For each of the examples, the manufacturing yield of the parts is indicated, that is to say percentage of parts which were neither fragmented nor exhibited transverse cracks. The yield is considered to be "acceptable" if it is greater than 60%, and as "good" if it is greater than 70%.

The average chemical composition of the products obtained is given in Table 1 in percentages by weight on the basis of the oxides.

transforming some of the alumina into sodium aluminate. The expansion that accompanies this transformation embrittles the material by creating microcracks in the transformed alumina grains. Moreover, sodium aluminates have the characteristic of being very soluble in water. In test A, the specimen was placed in a zirconium crucible and covered with sodium hydroxide. The crucible was then heated for one hour at 900° C. The specimen was then immersed in distilled water and the dissolved alumina was assayed. The figure indicated for test A corresponds to the percentage of dissolved alumina. The value is deemed to be good if it is less than 2.5 and very good if it is less than 1.5.

The capability of a specimen to withstand thermal variations was determined using test B, which consisted in subjecting the entire parts to thermal cycles. Each cycle consisted of a soak phase at 1250° C. for 15 minutes followed by a cooling phase in the ambient air for 15 minutes. The value indicated corresponds to the number of cycles before the part fractured or fragmented. The tested parts are considered to be compatible with use in regenerator checker works if the number of cycles before fracture is greater than or equal to 20.

The specimen of example 1 of table 1 is the product ER1682RX manufactured and sold by SEPR. It contains

TABLE 1

| Specimen | $Al_2O_3$ + impurities | MgO | $SiO_2$ | $Na_2O$ | CaO | $ZrO_2$ | Yield | Test A | Test B | $AlF_3$ |
|---|---|---|---|---|---|---|---|---|---|---|
| 1 | 51.30 | 0.00 | 15.60 | 1.10 | | 32.0 | | 5 | | NO |
| 2 | 98.65 | 0.00 | 0.99 | 0.36 | | | 100 | 0.9 | 10 | NO |
| 3 | 97.74 | 0.00 | 0.56 | 0.30 | 1.40 | | 75 | 4.3 | 10 | YES |
| 4 | 98.92 | 0.38 | 0.45 | 0.25 | | | 80 | | 10 | NO |
| 5 | 98.48 | 0.72 | 0.55 | 0.25 | | | 80 | 0.64 | 20 | NO |
| 6 | 98.23 | 0.85 | 0.62 | 0.30 | | | 70 | | 22 | YES |
| 7 | 97.77 | 0.85 | 1.14 | 0.24 | | | 70 | 1.19 | 20 | YES |
| 8 | 98.48 | 0.87 | 0.22 | 0.13 | | 0.3 | 70 | | | YES |
| 9 | 98.87 | 0.88 | 0.00 | 0.25 | | | 0 | | | NO |
| 10 | 97.89 | 1.00 | 0.85 | 0.26 | | | 70 | | >20 | YES |
| 11 | 97.16 | 1.00 | 1.59 | 0.25 | | | 70 | 1.32 | 20 | YES |
| 12 | 96.90 | 1.00 | 0.50 | 0.20 | | 1.4 | 80 | 0.94 | >20 | YES |
| 13 | 95.73 | 1.00 | 0.50 | 0.27 | | 2.5 | 70 | | | YES |
| 14 | 98.06 | 1.06 | 0.25 | 0.13 | | 0.5 | 70 | | | YES |
| 15 | 97.99 | 1.08 | 0.53 | 0.20 | 0.20 | | 78 | 1.06 | >20 | YES |
| 16 | 98.67 | 1.09 | 0.00 | 0.24 | | | 0 | | | NO |
| 17 | 98.15 | 1.10 | 0.55 | 0.20 | | | 75 | | >26 | NO |
| 18 | 96.56 | 1.12 | 1.93 | 0.39 | | | 70 | 1.52 | | YES |
| 19 | 96.98 | 1.14 | 0.54 | 0.24 | 1.10 | | 78 | 1.64 | 15 | YES |
| 20 | 95.79 | 1.15 | 0.63 | 0.33 | 2.10 | | 77 | | 10 | YES |
| 21 | 98.58 | 1.17 | 0.00 | 0.25 | | | 30 | | | YES |
| 22 | 97.03 | 1.22 | 1.30 | 0.45 | | | 85 | | | NO |
| 23 | 94.23 | 1.28 | 0.54 | 0.25 | | 3.7 | 60 | 1.07 | 20 | YES |
| 24 | 97.84 | 1.32 | 0.60 | 0.24 | | | 89 | 1.04 | >30 | YES |
| 25 | 97.84 | 1.32 | 0.60 | 0.24 | | | 89 | 0.85 | >30 | YES |
| 26 | 98.37 | 1.33 | 0.00 | 0.30 | | | 0 | | >26 | NO |
| 27 | 97.66 | 1.33 | 0.79 | 0.22 | | | 89 | | >30 | YES |
| 28 | 96.81 | 1.35 | 1.27 | 0.57 | | | 70 | | | NO |
| 29 | 98.01 | 1.36 | 0.39 | 0.24 | | | 100 | 0.42 | >26 | YES |
| 30 | 97.18 | 1.80 | 0.30 | 0.12 | | 0.6 | | 1.12 | >20 | YES |
| 31 | 96.72 | 1.83 | 1.11 | 0.34 | | | 70 | | >20 | NO |
| 32 | 97.31 | 1.98 | 0.48 | 0.23 | | | 80 | | 20 | YES |
| 33 | 96.42 | 2.25 | 0.48 | 0.15 | | 0.7 | 70 | | 16 | YES |
| 34 | 96.88 | 2.32 | 0.56 | 0.24 | | | 70 | 0.64 | 18 | NO |
| 35 | 95.31 | 3.91 | 0.47 | 0.31 | | | 69 | 0.46 | 15 | NO |
| 36 | 87.50 | 8.00 | 0.00 | 4.50 | | | 100 | 5.9 | >31 | NO |

The impurities do not comprise MgO, $Na_2O$, CaO and $ZrO_2$.

To simulate the condensation of sodium hydroxide resulting from the flue gases in glass furnaces, we tested (test A) the resistance to liquid sodium hydroxide of specimens taken from the center of one branch of the various parts produced. Liquid sodium hydroxide embrittles materials, about 50% $Al_2O_3$, 32% $ZrO_2$ and 16% $SiO_2$. Its crystallographic analysis reveals about 47% corundum, 21% glassy phase and 32% zirconia. The specimen of example 36 of table 1 is the product ER5312RX cited in the preamble of the description.

The following conclusions may be drawn from analysis of table 1.

Examples 1 to 4 show that the addition of at least 0.4% magnesia (MgO) is necessary in order to obtain products that can pass tests A and B. The aluminous products containing little or no magnesia therefore would not withstand the thermal shocks when used as a checker work element of a regenerator.

Comparing example 4 with example 5 indicates that an MgO content of greater than 0.7% is preferable, so as to improve the resistance to thermal cycling. The upper MgO limit seems to be due to a eutectic point between corundum and spinel.

However, examples 33 to 35 demonstrate that above 2% MgO the products are much less resistant to thermal cycling. This degraded resistance is probably due to an increase in the density of the products and to a poor control of the porosity, that is to say poor distribution of the pore volume, making these products unusable for the intended application. Preferably, the MgO content is therefore less than 2.5%, and better still less than 2%.

Example 36, containing 8% MgO, is representative of the prior art. It contains no $SiO_2$ and has a low resistance to alkaline corrosion as defined by test A. However, it does exhibit very good thermal shock behavior.

We believe that the MgO content of the products according to the invention give them a pore volume and a distribution of this pore volume that are such that the parts can accommodate volume variations due to the temperature variations. This is because the products of the invention have a porosity of typically between 10 and 20%, this being distributed almost uniformly throughout the part.

According to the invention, the presence of silica is necessary in order to have correct industrial feasibility, that is to say a yield of 70% or higher, as examples 9, 16, 21 and 26 show, without increasing the $Na_2O$ content, in which case (example 36) of product no longer passes test A.

A minimum quantity of 0.2% $SiO_2$ is needed to obtain a significant effect. Preferably, an $SiO_2$ content of greater than 0.4%, more preferably greater than 0.5%, is desirable, particularly in order to increase the thermal-shock resistance.

However, above 1% (examples 7, 11, 18), the alkaline corrosion resistance of the product decreases. Preferably, the $SiO_2$ content is therefore preferably less than 2%, more preferably less than 1%. Above 2%, the silicate phase, which is more brittle when exposed to alkali metal vapor, is formed in too large an amount.

The presence of $Na_2O$ may also lead to the formation of beta-alumina, the alkaline corrosion resistance of which is poor. Above 0.6%, the alkaline corrosion resistance becomes insufficient, as examples 1 and 36 show.

The addition of $Na_2O$, preferably in an amount of greater than 0.1% in order to obtain a significant effect, is advantageous since $Na_2O$ combines with silica and the other compounds to form a glassy phase, the intergranular positioning of which is favorable to improving the mechanical strength of the material at high temperature. Thus, the formation of stresses during temperature changes is avoided.

The presence of at least 0.1% fluorine is advantageous in order to improve the uniformity of the pore volume distribution; indeed a visual examination of the products demonstrates that the presence of fluorine avoids the presence of "pockets" within the products. However, the influence of fluorine on the results of tests A and B is not appreciable.

However, fluorine is an element that is highly corrosive toward installations and it is therefore necessary to limit its content to less than 0.6%.

Limited intentional additions of zirconia do not diminish the advantageous properties of the products of the invention. The presence of zirconia with contents of less than 4% is tolerated. However, a larger quantity of zirconia leads to poor performance in thermal cycling and to more difficult industrial feasibility. Example 23 therefore has a yield on the limit of acceptability. For these reasons, the zirconia content must be less than 4%, preferably less than 1% and more preferably zero.

The addition of CaO is not desirable. This addition has no beneficial influence on the alkali metal vapor resistance (example 3). Furthermore, the thermal cycle behavior is substantially degraded (examples 3, 19 and 20).

The CaO content of the product according to the invention is therefore less than 0.4%, preferably less than 0.1% and more preferably substantially zero. This is because the presence of CaO leads to the formation of lime aluminates, in particular $CaO.6Al_2O_3$, having a structure similar to beta-alumina, which are less resistant to corrosion in an alkaline environment. Not all alkaline earths therefore offer the same advantages as MgO.

The presence of other compounds, other than the inevitable impurities, is not desirable. In particular, $B_2O_3$ and $K_2O$ must be avoided. Their respective contents must preferably be less than 0.05%.

Crystallographic analysis of the products of the invention typically reveals more than 97% alumina in corundum form, more than 2% $Al_2O_3$—MgO spinel and less than 1% silica phase or glassy phase. The products whose chemical composition reveals the presence of zirconia have, from crystallographic analysis, up to 4% zirconia in monoclinic form, the corundum content being reduced proportionally.

The invention claimed is:

1. Fused-cast refractory product having the following average chemical composition by weight, the percentages by weight being on the basis of the oxides:
   0.4%<MgO<2.0%; 0≦$Na_2O$<0.6%
   0.2%<$SiO_2$<2.0%; 0≦F<0.6%
   CaO<0.4%; 0≦$ZrO_2$<4%
   impurities: <0.5%; $B_2O_3$<0.05%
   $Al_2O_3$: balance.

2. Refractory product according to claim 1, which contains, as a percentage by weight on the basis of the oxides, an MgO content such that:
   0.7%<MgO.

3. Refractory product according to claim 1, which contains, as a percentage by weight on the basis of the oxides, an $SiO_2$ content such that:
   0.5%<$SiO_2$<1%.

4. Refractory product according to claim 1, which contains, as a percentage by weight on the basis of the oxides, an $Na_2O$ content such that:
   0.1%<$Na_2O$.

5. Refractory product according to claim 1, which contains, as a percentage by weight on the basis of the oxides, an F content such that:
   0.1%<F.

6. Refractory product according to claim 1, which contains, as a percentage by weight on the basis of the oxides, a CaO content such that:
   CaO<0.1%.

7. Refractory product according to claim 1, which contains, as a percentage by weight on the basis of the oxides, a $ZrO_2$ content such that:
   $ZrO_2$<0.1%.

8. Refractory product according to claim 1, which contains, as a percentage by weight on the basis of the oxides, an $Na_2O$ content such that:
$Na_2O \leqq 0.45\%$.

9. Refractory product according to claim 1, which contains, as a percentage by weight on the basis of the oxides, an $Na_2O$ content such that:
$Na_2O \leqq 0.39\%$.

10. Fused-cast refractory product having the following average chemical composition by weight, the percentages by weight being on the basis of the oxides:
$0.4\% < MgO < 2.5\%$; $0 \leqq Na_2O < 0.6\%$
$0.2\% < SiO_2 < 2.0\%$; $0.1 < F < 0.6\%$
$CaO < 0.4\%$; $0 \leqq ZrO_2 < 4\%$
impurities: $<0.5\%$; $B_2O_3 < 0.05\%$
$Al_2O_3$: balance.

11. Fused-cast refractory product having the following average chemical composition by weight, the percentages by weight being on the basis of the oxides:
$0.4\% < MgO < 2.5\%$; $0 \leqq Na_2O < 0.6\%$
$0.2\% < SiO_2 < 2.0\%$; $0 \leqq F < 0.6\%$
$CaO < 0.4\%$; $0 \leqq ZrO_2 < 0.1\%$
impurities: $<0.5\%$; $B_2O_3 < 0.05\%$
$Al_2O_3$: balance.

* * * * *